(12) United States Patent
Yonushonis et al.

(10) Patent No.: US 11,187,171 B2
(45) Date of Patent: Nov. 30, 2021

(54) AUTOMATIC ENGINE CONTROL FOR CARBON MONOXIDE CONDITIONS

(71) Applicant: Cummins Inc., Columbus, IN (US)

(72) Inventors: Thomas M. Yonushonis, Columbus, IN (US); Jennifer K Light-Holets, Greenwood, IN (US); Joseph P. Chandraraj, Maharashtra (IN); Aaron William Beinborn, Columbus, IN (US); Govindarajan Kothandaraman, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/024,863

(22) Filed: Sep. 18, 2020

(65) Prior Publication Data

US 2021/0140379 A1    May 13, 2021

Related U.S. Application Data

(60) Provisional application No. 62/931,898, filed on Nov. 7, 2019.

(51) Int. Cl.
| | |
|---|---|
| *F02D 41/02* | (2006.01) |
| *F02D 41/04* | (2006.01) |
| *G01S 19/42* | (2010.01) |
| *F02D 41/06* | (2006.01) |
| *E05F 15/72* | (2015.01) |

(52) U.S. Cl.
CPC ............ *F02D 41/021* (2013.01); *E05F 15/72* (2015.01); *F02D 41/042* (2013.01); *F02D 41/065* (2013.01); *G01S 19/42* (2013.01); *E05Y 2400/44* (2013.01); *E05Y 2400/52* (2013.01); *E05Y 2900/106* (2013.01); *F02D 2200/024* (2013.01); *F02D 2200/04* (2013.01); *F02D 2200/08* (2013.01); *F02D 2200/501* (2013.01); *F02D 2200/701* (2013.01); *F02D 2200/703* (2013.01)

(58) Field of Classification Search
CPC .... F02D 41/021; F02D 41/042; F02D 41/065; F02D 2200/04; F02D 2200/501; F02D 2200/08; F02D 2200/703; F02D 2200/024; F02D 2200/701; E05F 15/72; G01S 19/42; E05Y 2400/44; E05Y 2400/52; E05Y 2900/106
See application file for complete search history.

(56) References Cited

U.S. PATENT DOCUMENTS

| | | |
|---|---|---|
| 6,433,696 B1 | 8/2002 | Deiterman et al. |
| 9,880,973 B2 | 1/2018 | Haskew et al. |
| 2012/0227389 A1* | 9/2012 | Hinderks ................ F01L 1/146 60/317 |
| 2014/0174407 A1* | 6/2014 | Koppel .............. F02M 37/0052 123/495 |
| 2018/0251194 A1* | 9/2018 | Takaishi .............. F02D 41/0025 |
| 2018/0252174 A1* | 9/2018 | Hagiwara ........... F02D 19/0615 |

FOREIGN PATENT DOCUMENTS

| | | |
|---|---|---|
| WO | 2009134206 | 11/2009 |
| WO | 2018183684 | 10/2018 |

* cited by examiner

*Primary Examiner* — Joseph J Dallo
(74) *Attorney, Agent, or Firm* — Taft Stettinius & Hollister LLP

(57) ABSTRACT

An internal combustion engine is controlled in response to a location of the engine and an operational status of the engine to stop or reduce carbon monoxide emissions.

20 Claims, 2 Drawing Sheets

AUTOMATIC ENGINE CONTROL FOR CARBON MONOXIDE CONDITIONS

CROSS-REFERENCE TO RELATED APPLICATION

The present application claims the benefit of the filing date of U.S. Provisional Application Ser. No. 62/931,898 filed on Nov. 7, 2019, which is incorporated herein by reference in its entirety.

TECHNICAL FIELD

The present disclosure relates generally to monitoring of carbon monoxide conditions at a location and automatic engine control at the location in response to the same.

BACKGROUND

An engine operating in an enclosed space presents safety concerns due to carbon monoxide emissions. Vehicles with push button types of operator initiated start and stop control of the engine can exasperate this issue since the operator may forget to shut down the engine before exiting the vehicle. Thus, there is a need for utilizing relevant information to determine carbon monoxide conditions and respond to the same to address potential safety issues.

SUMMARY

The present disclosure describes a detection system that determines an unsafe carbon monoxide condition due to, for example, emissions or potential emissions from an operating engine, and initiates an automatic engine shut down in response to the same, or prevents the automatic starting of an engine that includes automatic start/stop capability in response to the same.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
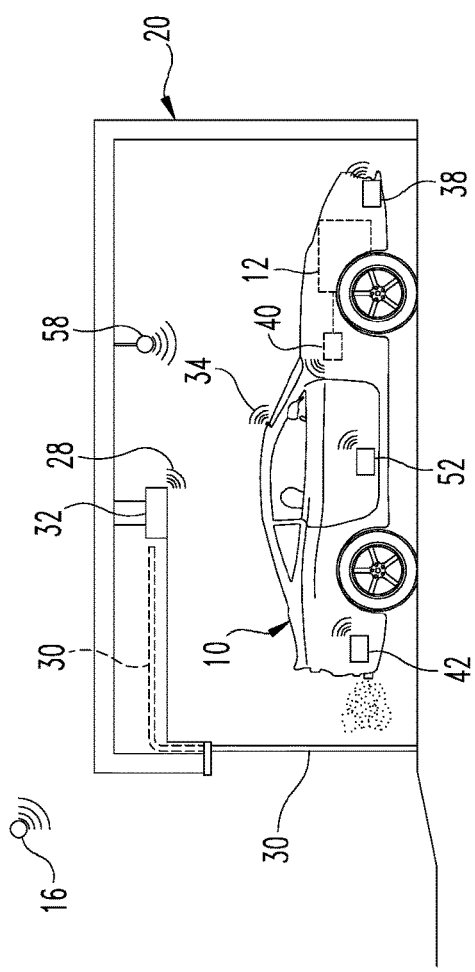
FIG. 1 illustrates a vehicle at a location that includes an enclosed space and a carbon monoxide monitoring system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

The present disclosure is applicable to any prime mover capable of emitting carbon monoxide, such as an internal combustion engine that is operable to propel a vehicle. The prime mover may also include an electric motor or other device capable of propelling the vehicle under at least some operating conditions. The present disclosure describes a carbon monoxide monitoring apparatus, system, method and technique that uses the location of the vehicle and/or internal combustion engine to automatically change an operational status of the engine to stop or reduce carbon monoxide emissions at the location. The change in operational status can include, for example, shutting down an operating engine to prevent or stop further carbon monoxide emissions. The change in operational status may also or alternatively include preventing a re-start of an engine with automatic start/stop capabilities, such as may be provided with a hybrid type prime mover or a prime mover with a range extender, which automatically starts and stops the engine.

FIG. 1 depicts a vehicle 10 at a location 20. The vehicle 10 includes a prime mover 12 that is operably connected to an electronic controller 40. In the illustrated embodiment, the electronic controller 40 is shown as being part of vehicle 10, but in other embodiments all or a part of the electronic controller 40 may be provided at location 20 separately from vehicle 10, and/or at a remote location, and is operable to communication with the vehicle controller to control prime mover 12 to reduce or stop carbon monoxide emissions as discussed herein.

The prime mover 12 is operable to propel the vehicle 10 and produces emissions 14 that include carbon monoxide. Accordingly, it is desirable to limit operation of prime mover 12 at the location 20 to prevent undesirable accumulation of carbon monoxide at the location 20. In the illustrated embodiment, location 20 is an enclosed space such as a garage, but other locations are also contemplated including locations defined by a virtual geographic boundary such as a geo-fence boundary. Virtual geographic boundaries can define a location 20 that surrounds the garage, an enclosure, a parking space, or other off-road or parking location in which it is desirable to avoid an accumulation of carbon monoxide.

Controller 40 is configured to receive one or more inputs from vehicle 10 and/or from one or more external sources to determine a position of vehicle 10 and/or prime mover 12 relative to the location 20. Controller 40 is also configured to determine an operational status of prime mover 12, such as whether prime mover 12 is in an engine idling condition or an engine shut down condition. Controller 40 is further configured to change the operational status of prime mover 12 to stop or reduce carbon monoxide emissions at the location 20 based on the presence of the vehicle 10 at the location 20 and one or more of an estimate or measurement of carbon monoxide levels at the location 20.

Figure 2:
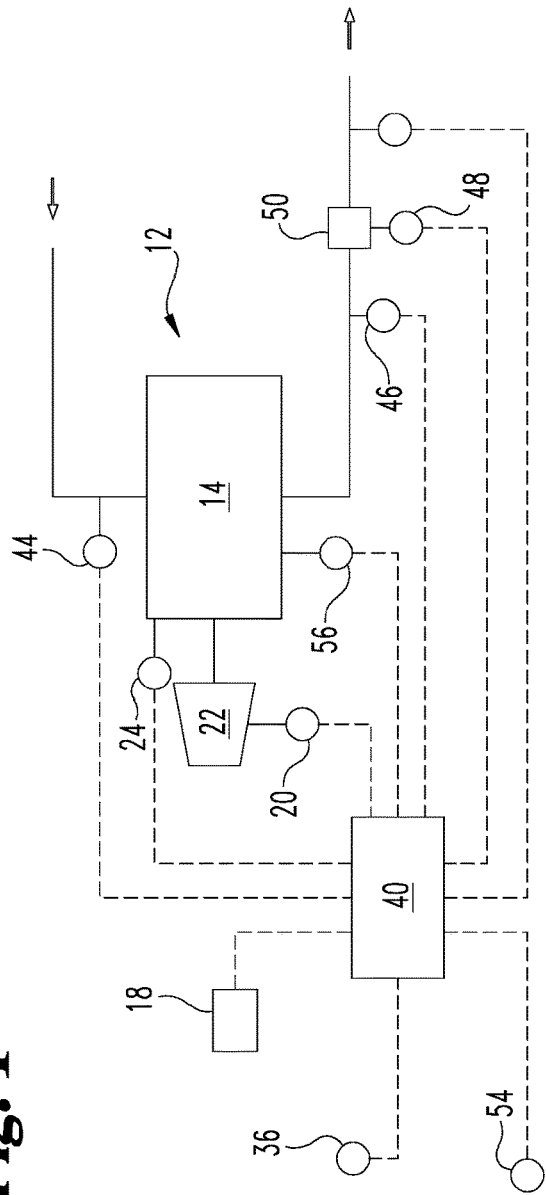
FIG. 2 illustrates a block diagram of an internal combustion engine and electronic controller of the present disclosure.

Referring further to FIG. 2, in one embodiment, controller 40 is configured to prevent automatic starting of an internal combustion engine 14 of the prime mover 12 that has a stopped or non-emissions producing operational status. For example, prime mover 12 may include an electric motor (not shown) that is operable to propel vehicle 10 under certain operating conditions, or a range extender that automatically starts and stops engine 14. Therefore, engine 14 re-starts automatically under certain conditions to maintain energy storage levels for operation of the electric motor. Controller 40 prevents or overrides the nominal automatic engine re-start conditions in response to the vehicle 10 being present at the location 20 to prevent or stop carbon monoxide emissions from engine 14.

In an embodiment, controller 40 is configured to automatically shut down engine 14 of the prime mover 12 based on the vehicle 10 being at the location 20 with the engine 14 operating or idling and producing carbon monoxide emissions. For example, controller 40 can be configured to determine a duration in which the engine 14 is operating at the location 20 and shut down engine 14 if the duration of operation exceeds a threshold duration. The duration of operation of engine 14 provides an estimate of carbon monoxide levels at the location 20. Controller 40 may also be configured to issue an alarm prior to shutting down the engine 14 to allow the operator a period of time to take an action to prevent the automatic engine shut down if desired.

Various techniques for determining location 20 and/or the position of the vehicle 10 relative to location 20 are contemplated. An embodiment includes controller 40 identifying the location 20 in response to a wireless signal 16 associated with the location 20. The wireless signal 20 can be emitted by one or more of a WiFi network, a radio frequency device, and a Bluetooth device that identifies the location 20 to controller 40. Controller 40 can identify the location 20 in response to the wireless signal and, in response, change an operational status of prime mover 12 to stop or reduce carbon monoxide emissions. For example, engine 14 can be shut down if controller 14 determines that engine 14 has been running or idling at location 20 for more than a threshold duration, or prevent an automatic re-start of engine 14 is already shut down.

In an embodiment, a global positioning system (GPS) device 18 provides a signal to controller 40 that indicates the location 20 of vehicle 10. The wireless signal 16 and/or GPS device 18 can provide controller 40 with location 20 associated with an enclosed space or virtual geographic boundary so that the operational status of prime mover 12 can be changed to reduce or stop carbon monoxide emissions at the location 20.

In an embodiment, controller 40 determines a speed of vehicle 10 from speed sensor 24 and/or a transmission state of transmission 22 from transmission sensor 26. One or more of these inputs can be used in combination with the location 20 to initiate carbon monoxide monitoring for the vehicle 10. For example, a vehicle speed of "0" and/or a transmission state of "Park" can indicate the vehicle is at rest or parked at the location 20, and not intended to be moved. In response, the controller 40 can initiate monitoring to reduce or stop carbon monoxide emissions when necessary.

In an embodiment, controller 40 receives a signal indicating operation of a door 30 at the location 20 to assist in determining the position of vehicle 10 relative to the location 20. For example, the door 30 can be a garage door operated by a garage door opener 32 via a remote controller 34 in the vehicle 10. The controller 40 can receive a signal 28 from the opener 32 and/or from remote controller 34 to indicate that vehicle 10 is at location 20. Remote controller 34 can be a separate controller for the opener 32, or integrated into vehicle 10. Controller 40 can be configured to associate activation of the garage door opener 32 and a subsequent transmission state of "Park" with the location 20 to initiate monitoring for carbon monoxide emissions reduction/prevention.

In an embodiment, controller 40 is configured to determine an ambient light condition with a light sensor 36. The ambient light detection can be used in combination with a time of day to determine whether the vehicle 10 has entered a garage or other enclosure at the location 20 by determining a change in ambient light.

Controller 40 can be configured in an embodiment to utilize one or more proximity sensors 38 to determine a proximity of one or more objects to vehicle 10 at the location 20. Proximity sensors 38 can be, for example, parking sensors that detect the presence of location of one or more objects that are indicative of the location 20, such as within a garage or other enclosed space.

Other sensors are contemplated as capable of being implemented to determine or assist in determining the positioning of the vehicle 10 relative to the location 20, for improving detection of the presence of the vehicle 10 at the location 20, and/or for detecting a carbon monoxide level at location 20. For example, an intake oxygen sensor 44 connected to the intake of engine 14, and/or an exhaust oxygen sensor 46 connected to the exhaust of engine 14, can be used to determine a reduction in oxygen level associated with a carbon monoxide increase in an enclosed space and/or in proximity to vehicle 10. In another example, a NOx sensor 48 associated with a catalyst 50 connected to engine 12 could be used to determined higher carbon monoxide emissions due to sensitivity to higher NOx and carbon monoxide at the intake of engine 12. In yet another example, a pressure sensor 56 associated with one or more cylinders of engine 14 can be used to detect reductions in combustion quality associated with increase carbon monoxide intake.

In still another example, an ambient temperature sensor 54 can be used to detect an increase in ambient temperature at the location 20 due to engine 14 operating in the enclosed space. A vehicle camera sensor 42 can be employed to detect a change or increase in air opacity due to smoke produce by operating engine 14 in an enclosed space at the location 20. A vehicle safety/occupancy sensor(s) 52 (such as a seatbelt sensor, load sensor, etc.) can be used to determine if there is an occupant in the vehicle 10. Controller 40 can be configured to use such information, in combination with any one or more of techniques described herein, to determine, verify, and/or confirm the position of vehicle 10 and/or carbon monoxide levels at the location 20 before initiating and/or executing a change in operational status of the prime mover 12 to stop or reduce carbon monoxide emissions.

Figure 3:
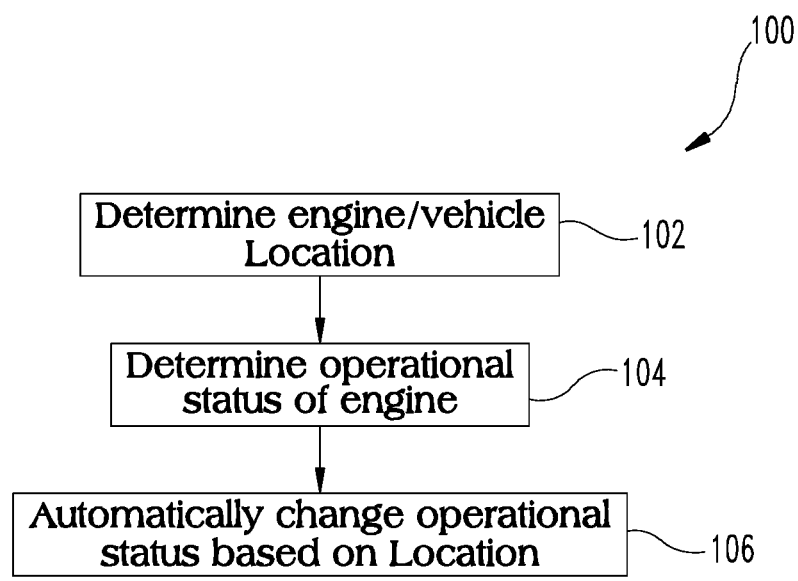
FIG. 3 is a flow diagram of an embodiment of a carbon monoxide monitoring and engine control procedure according to the present disclosure.

A flow diagram of an embodiment of a procedure 100 for operation by controller 40 is shown in FIG. 3. Procedure 100 includes an operation 102 to determine a location of the vehicle 10 and prime mover 12 with engine 14 associated therewith. Procedure 100 also includes an operation 104 to determine an operational status of engine 14, i.e. whether engine 14 is in operation and producing emissions, or whether engine 14 is shut down. Procedure 100 continues at operation 106 to automatically change an operational status of the engine 14 based on the location such as, for example, location 20 as described above, in order to stop or reduce carbon monoxide emissions at the location 20.

Various embodiments of procedure 100 are contemplated. In an embodiment, automatically changing the operational status includes preventing the engine 14 from automatically starting. In an embodiment, automatically changing the operational status includes automatically shutting down the engine 14 from an operating state.

In an embodiment, the procedure 100 includes determining a duration the internal combustion engine 14 has been operating at the location 20 is more than a threshold duration before automatically changing the operational status. In an embodiment, the procedure 100 includes initiating an alarm before automatically changing the operational status of the engine 14.

In an embodiment of procedure 100, determining the location includes detecting a wireless signal or network associated with the location. In certain embodiments, the wireless signal is provided by one or more of a WiFi network, a radio frequency device, and a Bluetooth device.

The location can be one or more of an enclosed space, a geo-fence boundary, a garage, a parking space, etc. In an embodiment of procedure 100, the location is determined with a GPS device. Various techniques to determine the location and/or assist or verify the location are contemplated. In an embodiment, at least one of a speed and a gear state associated with the engine 14 is determined in conjunction with the location 20. In an embodiment, an activation of an automatic door opener is determined in conjunction with the location. In an embodiment, an ambient light condition is determined in conjunction with the location. In an embodiment, a proximity of one or more objects at the location is determined with one or more proximity sensors to assist in identifying the location.

In an embodiment of procedure 100, one or more sensors are utilized to detect an enclosed space, a carbon monoxide level, or other condition associated with location 20. The one or more sensors may include one or more of the following: an intake oxygen sensor of the engine 14; a humidity sensor at the location or on the vehicle 10; an exhaust oxygen sensor of the engine 14; a NOx sensor connected to an exhaust of the engine 14 such as at the tailpipe and/or an engine out NOx sensor; a pressure sensor to detect a change in pressure across one or more aftertreatment components; a pressure sensor to detect an exhaust pressure; a sensor to detect a turbocharger speed; a temperature sensor for the engine and/or exhaust staying above a threshold temperature for longer than a threshold time period; an ambient temperature sensor at the location 20 or on the vehicle 10; one or more vehicle camera sensors of vehicle 10; a pressure sensor in a cylinder of the engine 14; a vehicle occupancy sensor of vehicle 10; and an engine sensor indicating an idle condition of engine 14.

In an embodiment, the procedure 100 further includes determining a carbon monoxide level at the location 20 is greater than a threshold amount before automatically changing the operational status of the engine 14. In an embodiment, the carbon monoxide level is determined with one or more of a carbon monoxide sensor 58 at the location 20 and a carbon monoxide sensor (not shown) on the vehicle 10. In an embodiment, controller 40 is configured to interface and sync with a carbon monoxide sensor 58 that is provided at location 20. In an embodiment, the carbon monoxide level is determined by estimating the carbon monoxide level. In an embodiment, the carbon monoxide level is estimated by a duration of operation of engine 14 at the location 20. In an embodiment, the carbon monoxide level is estimated based on an amount or rate of fuel consumption of the engine 14 at the location 20. It is contemplated that any one or more of the embodiments of procedure 100 may be combined as disclosed herein.

The schematic diagrams and procedures described above are generally set forth herein. As such, the depicted order and labeled steps are indicative of representative embodiments. Other steps, orderings, combinations of steps, and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the systems, apparatus, and methods illustrated by the diagrams. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled in order to more particularly emphasize their implementation independence. For example, one or more aspects of controller 40 may be implemented as a hardware circuit comprising custom VLSI circuits or gate arrays, off-the-shelf semiconductors such as logic chips, transistors, or other discrete components. Controller 40 may also be implemented in programmable hardware devices such as field programmable gate arrays, programmable array logic, programmable logic devices or the like.

One or more aspects of controller 40 may also be implemented in machine-readable medium for execution by various types of processors. In some instances, the machine-readable medium for execution by various types of processors may be implemented in the aforementioned hardware circuit. An identified module of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the controller 40.

For example, computer readable program code may be a single instruction, or many instructions, and may even be distributed over several different code segments, among different programs, and across several memory devices. Similarly, operational data may be identified and illustrated herein within a module, monitor, or circuit, and may be embodied in any suitable form and organized within any suitable type of data structure. The operational data may be collected as a single data set, or may be distributed over different locations including over different storage devices, and may exist, at least partially, merely as electronic signals on a system or network. Where a module, monitor, or circuit or portions thereof are implemented in machine-readable medium (or computer-readable medium), the computer readable program code may be stored and/or propagated on one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a controller, computer, other programmable data processing apparatus, or other devices to function in a particular manner, such that the instructions stored in the computer readable medium produce an article of manufacture including instructions which implement the function/act specified herein.

Various aspects of the present disclosure are contemplated. According to one aspect, a method for reducing or stopping carbon monoxide emissions from an internal combustion engine includes: determining a location of the internal combustion engine; determining an operational status of the internal combustion engine at the location; and automatically changing the operational status of the internal combustion engine in response to the location to reduce or stop carbon monoxide emissions.

According to another aspect of the present disclosure, an apparatus for controlling an internal combustion engine includes an electronic controller configured to determine a location of the internal combustion engine, determine an operational status of the internal combustion engine at the location, and automatically change the operational status of the internal combustion engine in response to the location to reduce or stop carbon monoxide emissions.

According to another aspect of the present disclosure, a system includes a vehicle including an internal combustion engine and a controller configured to determine a location of the vehicle, determine an operational status of the internal combustion engine at the location, and automatically change the operational status of the internal combustion engine in response to the location to reduce or stop carbon monoxide emissions.

Various embodiments of these aspects are also contemplated. It should be understood that one or more embodiments may be combined with one or more other embodiments of the present disclosure.

In one embodiment, automatically changing the operational status includes preventing the internal combustion engine from automatically starting. In one embodiment, automatically changing the operational status includes automatically shutting down the internal combustion engine while operating. In one embodiment, a duration of operation of the internal combustion engine at the location is determined to be more than a threshold duration before automatically changing the operational status. In one embodiment, an alarm is initiated before automatically changing the operational status of the internal combustion engine.

In one embodiment, the location is determined by detecting a wireless signal associated with the location. The wireless signal may be provided by, without limitation, one or more of a WiFi network, a radio frequency device, and a Bluetooth device. In one embodiment, the location is determined with a GPS device. In one embodiment, the location is one of an enclosed space and a geo-fence boundary.

In one embodiment, at least one of a speed and a gear state associated with the internal combustion engine is determined in conjunction with the location. In one embodiment, an activation of an automatic door opener at the location is determined in conjunction with determining the location. In one embodiment, an ambient light condition is determined in conjunction with determining the location. In one embodiment, a proximity of one or more objects at the location is determined in conjunction with determining the location.

In one embodiment, one or more sensors are utilized to detect a carbon monoxide condition at the location. The one or more sensors may include one or more of the following: an intake oxygen sensor of the internal combustion engine; a humidity sensor; an exhaust oxygen sensor of the internal combustion engine; a NOx sensor connected to an exhaust of the internal combustion engine; an ambient temperature sensor; one or more vehicle camera sensors; a pressure sensor in a cylinder of the internal combustion engine; a vehicle occupancy sensor; a change in pressure across one or more aftertreatment components; an exhaust pressure; a turbocharger speed; a temperature sensor staying above a threshold temperature for longer than a threshold time period; and an engine sensor indicating an engine idle condition. In an embodiment, the NOx sensor is at least one of an engine out NOx sensor and a tailpipe NOx sensor.

In one embodiment, a carbon monoxide level at the location is determined to be greater than a threshold amount before automatically changing the operational status of the internal combustion engine. In one refinement, the carbon monoxide level is determined with one or more of a carbon monoxide sensor at the location and a carbon monoxide sensor on a vehicle propelled by the internal combustion engine. In another refinement, the carbon monoxide level is determined by estimating the carbon monoxide level. In a further refinement, the carbon monoxide level is estimated based on an amount or rate of fuel consumption of the internal combustion engine.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for reducing or stopping carbon monoxide emissions from an internal combustion engine, comprising:
    determining a location of the internal combustion engine;
    determining an operational status of the internal combustion engine at the location; and
    automatically changing the operational status of the internal combustion engine in response to the location to reduce or stop carbon monoxide emissions.

2. The method of claim 1, wherein automatically changing the operational status includes preventing the internal combustion engine from automatically starting.

3. The method of claim 1, wherein automatically changing the operational status includes automatically shutting down the internal combustion engine while operating.

4. The method of claim 1, further comprising determining a duration of operation of the internal combustion engine at the location is more than a threshold duration before automatically changing the operational status.

5. The method of claim 1, further comprising initiating an alarm before automatically changing the operational status of the internal combustion engine.

6. The method of claim 1, wherein determining the location includes detecting a wireless signal associated with the location, wherein the wireless signal is provided by one or more of a WiFi network, a radio frequency device, and a Bluetooth device.

7. The method of claim 1, wherein determining the location includes determining the location with a GPS device.

8. The method of claim 1, wherein the location is one of an enclosed space and a geo-fence boundary.

9. The method of claim 1, further comprising at least one of the following:
    determining at least one of a speed and a gear state associated with the internal combustion engine in conjunction with the location;
    determining an activation of an automatic door opener at the location in conjunction with determining the location;
    determining an ambient light condition in conjunction with determining the location; and
    determining a proximity of one or more objects at the location in conjunction with determining the location.

10. The method of claim 1, further comprising utilizing one or more sensors to detect a carbon monoxide condition at the location.

11. The method of claim 10, wherein the one or more sensors include one or more of the following:
    an intake oxygen sensor of the internal combustion engine;
    a humidity sensor;
    an exhaust oxygen sensor of the internal combustion engine;
    a NOx sensor connected to an exhaust of the internal combustion engine;
    an ambient temperature sensor;
    one or more vehicle camera sensors;
    a pressure sensor in a cylinder of the internal combustion engine;
    a vehicle occupancy sensor;
    a change in pressure across one or more aftertreatment components;
    an exhaust pressure;
    a turbocharger speed;
    a temperature sensor staying above a threshold temperature for longer than a threshold time period; and
    an engine sensor indicating an engine idle condition.

12. The method of claim 11, wherein the NOx sensor is at least one of an engine out NOx sensor and a tailpipe NOx sensor.

13. The method of claim 1, further comprising determining a carbon monoxide level at the location is greater than a threshold amount before automatically changing the operational status of the internal combustion engine.

14. The method of claim 13, wherein the carbon monoxide level is determined with one or more of a carbon monoxide sensor at the location and a carbon monoxide sensor on a vehicle propelled by the internal combustion engine.

15. The method of claim 13, wherein the carbon monoxide level is determined by estimating the carbon monoxide level.

16. The method of claim 15, wherein the carbon monoxide level is estimated based on an amount or rate of fuel consumption of the internal combustion engine.

17. An apparatus for controlling an internal combustion engine, comprising:
    an electronic controller configured to determine a location of the internal combustion engine, determine an operational status of the internal combustion engine at the location, and automatically change the operational status of the internal combustion engine in response to the location to reduce or stop carbon monoxide emissions.

18. The apparatus of claim 17, wherein the electronic controller is configured to determine a carbon monoxide level at the location is greater than a threshold amount and automatically change the operational status of the internal combustion engine by preventing the internal combustion engine from automatically starting or automatically shutting down the internal combustion engine while operating.

19. A system, comprising:
a vehicle including an internal combustion engine and a controller configured to determine a location of the vehicle, determine an operational status of the internal combustion engine at the location, and automatically change the operational status of the internal combustion engine in response to the location to reduce or stop carbon monoxide emissions.

20. The system of claim 19, wherein the controller is configured to determine a carbon monoxide level at the location is greater than a threshold amount and automatically change the operational status of the internal combustion engine by preventing the internal combustion engine from automatically starting or automatically shutting down the internal combustion engine while operating.

* * * * *